US012614397B2

(12) United States Patent
Saito

(10) Patent No.: US 12,614,397 B2
(45) Date of Patent: Apr. 28, 2026

(54) LIGHT STATE RECOGNITION DEVICE

(71) Applicant: TOYOTA JIDOSHA KABUSHIKI KAISHA, Toyota (JP)

(72) Inventor: Hiroki Saito, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 268 days.

(21) Appl. No.: 18/488,164

(22) Filed: Oct. 17, 2023

(65) Prior Publication Data

US 2024/0221388 A1     Jul. 4, 2024

(30) Foreign Application Priority Data

Dec. 28, 2022     (JP) ................................. 2022-212355

(51) Int. Cl.
G06V 20/58          (2022.01)
(52) U.S. Cl.
CPC ................................. G06V 20/584 (2022.01)
(58) Field of Classification Search
None
See application file for complete search history.

(56) References Cited

U.S. PATENT DOCUMENTS 8,355,851 B2     1/2013 Inoue et al.
8,370,040 B2     2/2013 Inoue et al.

| 8,417,430 B2 | 4/2013 | Saeki |
| 8,548,709 B2 | 10/2013 | Morita |
| 8,768,597 B2 | 7/2014 | Kagawa |
| 9,174,643 B2 | 11/2015 | Aso |
| 10,017,178 B2 | 7/2018 | Morimoto et al. |
| 10,118,617 B2 | 11/2018 | Urano et al. |
| 10,486,698 B2 | 11/2019 | Masui et al. |
| 11,900,689 B1 * | 2/2024 | King ...................... G06V 10/25 |
| 2019/0295419 A1 | 9/2019 | Tosa et al. |
| 2022/0001897 A1 * | 1/2022 | Vasoya .................... B60R 1/26 |
| 2022/0262244 A1 * | 8/2022 | Wakayama ...... G08G 1/096716 |
| 2023/0186645 A1 * | 6/2023 | Kang ................... G06V 20/584 |
| | | 382/104 |

FOREIGN PATENT DOCUMENTS

| JP | 2022-108760 A | 7/2022 |
| JP | 2023-070699 A | 5/2023 |

* cited by examiner

*Primary Examiner* — Oneal R Mistry
(74) *Attorney, Agent, or Firm* — SoraIP, Inc.

(57)          ABSTRACT

A light state recognition device includes: a determination unit that determines respective light states of first and second traffic lights at predetermined processing cycles, based on an image in which the first traffic light with an arrow light that is on a closer side when viewed from a host vehicle and the second traffic light with an arrow light that is on a further side when viewed from the host vehicle are captured; and an estimation unit that estimates, in a current processing cycle, when at least part of the first traffic light is not captured in the image, a current light state, based on the light state of the first traffic light that is determined by the determination unit in a past processing cycle, and the light state of the second traffic light that is determined by the determination unit in the current processing cycle.

3 Claims, 2 Drawing Sheets

| 11 — FRONT CAMERA | STORAGE DEVICE — 12 |

20 — LIGHT STATE RECOGNITION DEVICE — HMI — 13

21 — ENCLOSURE REGION EXTRACTION UNIT

DRIVING ASSISTANCE DEVICE    ACTUATOR

22 — LIGHT STATE DETERMINATION UNIT 14    15

23 — HOST VEHICLE TARGET DETERMINATION UNIT

24 — TRACKING UNIT

25 — CUT-OFF DETERMINATION AREA SETTING UNIT

26 — ARROW LIGHT CUT-OFF DETERMINATION UNIT

27 — MAIN LIGHT CUT-OFF DETERMINATION UNIT

28 — LIGHT STATE HOLDING UNIT

29 — LIGHT STATE ESTIMATION UNIT

FIG. 2

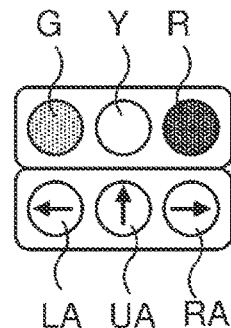

G  Y  R

LA  UA  RA

LIGHT STATE RECOGNITION DEVICE

CROSS-REFERENCE TO RELATED APPLICATION

This application claims priority to Japanese Patent Application No. 2022-212355 filed on Dec. 28, 2022, incorporated herein by reference in its entirety.

BACKGROUND

1. Technical Field

The present disclosure relates to a technical field of a light state recognition device.

2. Description of Related Art

In a device proposed as this type of device, a reference area is set in which a red light of a traffic light should be present, for example, based on the direction and the position of an arrow light of the traffic light that is present in an captured image of the front of the vehicle. Then, when the red light is present in the reference area, the device recognizes the direction of the arrow light that is detected as an indication of the traffic light (see Japanese Unexamined Patent Application Publication No. 2022-108760 (JP 2022-108760 A)).

SUMMARY

It is difficult for a camera to recognize a lit state of an arrow light in a traffic light with an arrow light, compared with a main light. In addition, due to at least one of a distance between a host vehicle and the traffic light, and an angle of view of a camera, an image of the whole traffic light may not be captured, and the arrow light may not be properly recognized.

It is an object of the present disclosure to provide a light state recognition device capable of appropriately recognizing a state of an arrow light.

A light state recognition device according to an aspect of the present disclosure includes: a determination unit that determines a light state of a first traffic light and a light state of a second traffic light at predetermined processing cycles, based on an image in which the first traffic light and the second traffic light are captured, the first traffic light being a traffic light with an arrow light that is installed at an intersection in front of a host vehicle and that is on a closer side when viewed from the host vehicle, and the second traffic light being a traffic light with an arrow light that is installed at the intersection and that is on a further side when viewed from the host vehicle; and an estimation unit that estimates, in a current processing cycle, when at least part of the first traffic light is not captured in the image, a current light state, based on the light state of the first traffic light that is determined by the determination unit in a past processing cycle prior to the current processing cycle, and the light state of the second traffic light that is determined by the determination unit in the current processing cycle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a block diagram showing the configuration of a vehicle according to an embodiment;

FIG. 2 is a diagram for explaining the lighting state of a traffic light;

DETAILED DESCRIPTION OF EMBODIMENTS

Figures 3, 4:
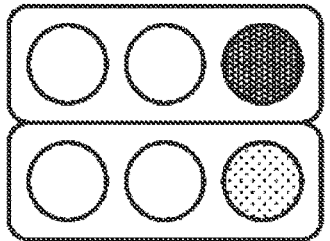
FIG. 3 is a diagram for explaining an example of the lighting state of a traffic light.
FIG. 4 is an example of an image showing an intersection where a traffic light with an arrow light is installed.

An embodiment of a light state recognition device will be described with reference to FIG. 1 to FIG. 4. A vehicle 1 equipped with a light state recognition device 20 according to an embodiment will be described with reference to FIG. 1.

In FIG. 1, a vehicle 1 includes a front camera 11, a storage device 12, an HMI 13, a driving assistance device 14, an actuator 15, and a light state recognition device 20. A front camera 11, a storage device 12, an HMI (Human Machine Interface) 13, a driving assistance device 14, and a light state recognition device 20 are connected. The driving assistance device 14 and the actuator 15 are connected. The front camera 11 is a camera for imaging the front of the vehicle 1. The front camera 11 may be provided behind the windshield of the vehicle 1. The front camera 11 transmits a captured image of the front of the vehicle 1 to the light state recognition device 20. Note that the front camera 11 may be a single monocular camera or a stereo camera.

The driving assistance device 14 controls the actuator 15. Actuator 15 is a device used to control the vehicle 1. The actuator 15 may include at least one of drive actuators, brake actuators and steering actuators.

When the vehicle 1 is a vehicle having an engine, the drive actuator controls the amount of air supplied to the engine (for example, throttle opening) according to a control signal from the driving assistance device 14, thereby controlling the driving force of the vehicle 1. When the vehicle 1 is a hybrid electric vehicle, the control signal from the driving assistance device 14 is input to the motor as the power source in addition to the drive actuator. As a result, the driving force of the motor is controlled. When the vehicle 1 is a battery electric vehicle, the control signal from the driving assistance device 14 is input to the motor as the power source. In this case, actuator 15 may not include a drive actuator. Incidentally, the actuator 15 may include a motor as a power source.

The brake actuator controls the brake system according to a control signal from the driving assistance device 14 and controls the braking force applied to the wheels of the vehicle 1. The steering actuator controls driving of an assist motor that controls steering torque in the electric power steering system according to a control signal from the driving assistance device 14. Thereby, the steering actuator controls the steering torque of the vehicle 1.

The driving assistance device 14 may cause the vehicle 1 to travel along the target trajectory by controlling the actuator 15 (specifically, at least one of the drive actuator, the brake actuator, and the steering actuator). That is, the driving assistance device 14 may perform autonomous driving of the vehicle 1 as one mode of driving assistance.

The HMI 13 is an interface for inputting and outputting information between a passenger (e.g., driver) of the vehicle 1 and a system of the vehicle 1 (e.g., driving assistance device 14 and light state recognition device 20). HMI 13 may have a display, speakers, and the like. The display of the HMI 13 may be a HUD (Head Up Display) or a multi-information display provided on the instrument panel.

The light state recognition device 20 includes a housing area extraction unit 21, a light state determination unit 22, a host vehicle target determination unit 23, and a tracking unit 24 as logical blocks that are logically configured or processing circuits that are physically realized, a cut-off determination area setting unit 25, an arrow light cut-off determination unit 26, a main light cut-off determination unit 27, a light state holding unit 28 and a light state estimation unit 29.

The housing area extraction unit 21 recognizes a traffic light in front of the vehicle 1 based on the image captured by the front camera 11. The housing area extraction unit 21 extracts a housing area corresponding to the housing of the traffic light appearing in the captured image. The housing area extraction unit 21 may recognize a traffic light by performing image processing (for example, at least one of edge extraction processing, noise removal processing, and pattern matching processing) on the captured image. When the captured image is input, the housing area extraction unit 21 may extract the housing region of the traffic light using an arithmetic model for extracting the housing region of the traffic light. An example of such a computational model is a computational model using a neural network (e.g., Convolutional Neural Network: CNN).

The light state determination unit 22 may recognize the shape of the housing of the traffic light based on the housing region extracted by the housing area extraction unit 21. At this time, the light state determination unit 22 may recognize that the traffic light is equipped with arrow lights based on the shape of the housing of the traffic light. When the traffic light is a traffic light with an arrow light, the light state determination unit 22 may determine the lighting state of the main light and the lighting state of the arrow light. If the traffic light does not have an arrow light, the light state determination unit 22 may determine the lighting state of the main light.

The lighting states of the main lights include a passage permission state (for example, a green light) that permits the passage of vehicles, a passage prohibition state (for example, a red light) that prohibits the passage of vehicles, and a transition from the passage permission state to the passage prohibition state. A signal transition state (e.g., a yellow light) may be included. Note that the signal transition state does not have to be included in the lighting state of the main light. The lighting states of the arrow lights include a first state in which the arrow lights are not lit, a second state in which the arrow lights are lit and the passage permission direction indicated by the arrow lights is specified, and a third state in which an arrow light is lit and the direction of passage permission indicated by the arrow light is unknown.

The light state determination unit 22 may generate main light color information indicating the color of the main light as the lighting state information indicating the lighting state of the main light. The light state determination unit 22 may generate arrow light direction information indicating the passage permitted direction indicated by the arrow light as the light state information indicating the lighting state of the arrow light. When the lighting state of the arrow light is the first state, the light state determination unit 22 does not need to generate the arrow light direction information. When the lighting state of the arrow light is the third state, the light state determination unit 22 may generate arrow light direction information indicating that the direction is unknown.

The lighting state will be explained with reference to FIG. 2 and FIG. 3. The traffic light with arrow lights shown in FIG. 2 has a blue main light G, a yellow main light Y, and a red main light R as main lights. In addition, the traffic light with arrow lights has, as arrow lights, a leftward arrow light LA, an upward arrow light UA, and a rightward arrow light RA.

When the main light G is on, the main lights Y and R and the arrow lights LA, UA and RA are off. In this case, the light state determination unit 22 may generate lighting state information indicating the passage permitted state. In this case, the light state determination unit 22 may generate main light color information indicating a green light as the lighting state information. Note that the light state determination unit 22 does not have to generate arrow lighting direction information.

When the main light Y is on, the main lights G and R and the arrow lights LA. UA and RA are off. In this case, the light state determination unit 22 may generate lighting state information indicating the signal transition state. In this case, the light state determination unit 22 may generate main light color information indicating a yellow light as the lighting state information. Note that the light state determination unit 22 does not have to generate arrow lighting direction information.

When the main light R is on and the main lights G and Y and the arrow lights LA, UA and RA are off, the light state determination unit 22 may generate light state information indicating a passage prohibited state. In this case, the light state determination unit 22 may generate main light color information indicating a red light as the lighting state information. Note that the light state determination unit 22 does not have to generate arrow lighting direction information.

When the main light R and at least one of the arrow lights LA, UA, and RA are on, and the main lights G and Y are off, the light state determination unit 22 may generate light state information indicating the passage prohibited state and the second state. In this case, the light state determination unit 22 may generate main light color information indicating a red light as the light state information, and may generate arrow light direction information that indicated the passage permission direction indicated by at least one of the lit arrow lights LA, UA, and RA.

The longer the distance from the vehicle 1 to the traffic light, the smaller the area occupied by the traffic light in the captured image. That is, the longer the distance from the vehicle 1 to the traffic light, the fewer the number of pixels included in the area occupied by the traffic light in the captured image. For example, when the main light R and the arrow light RA of the traffic light are on and the distance from the vehicle 1 to the traffic light is relatively long, the arrow light may become unclear in the captured image as shown in FIG. 4.

For this reason, the light state determination unit 22 may not be able to determine the passage permission direction indicated by the arrow light from the captured image. On the other hand, when the arrow light of the traffic light is lit, the luminance value of the area corresponding to the lit arrow light (the area corresponding to the arrow light RA in FIG. 4) is the luminance value of the surrounding area. Since it is higher, the light state determination unit 22 can determine that the arrow light is on and the position of the lighted arrow light (corresponding to the third state described above). In such a case, the light state determination unit 22 may generate, as the light state information, main light color information indicating a red light, and arrow light direction information indicating that the direction in which passage is permitted is unknown.

Returning to FIG. 1, the host vehicle target determination unit 23 estimates the position (e.g., height, angle, and lateral position) of the housing of the traffic light based on the housing region extracted by the housing area extraction unit 21. The host vehicle target determination unit 23 determines whether the traffic light targets the vehicle 1 (that is, the subject vehicle) (in other words, restricts the traveling of the vehicle 1) based on the estimated position of the traffic light housing.

The tracking unit 24 collects the traffic light state information determined by the light state determination unit 22 (for example, at least one of the main light color information and the arrow light direction information), and information indicating the determination result by the host vehicle target determination unit 23. to get The tracking unit 24 stores, among the lighting state information acquired from the light state determination unit 22, the lighting state information related to the traffic light determined by the host vehicle target determination unit 23 to be the traffic light for the vehicle 1, in the storage device 12. The information indicating the determination result by the host vehicle target determination unit 23 may include housing position information indicating the position of the housing of the traffic light intended for the vehicle 1. The tracking unit 24 may store housing position information in the storage device 12 in addition to the lighting state information.

Of the lighting state information acquired from the light state determination unit 22, the tracking unit 24 discards the lighting state information related to the traffic light determined by the host vehicle target determination unit 23 not to be the traffic light for the vehicle 1. may The light state determination unit 22 may determine the lighting state of only the traffic light determined by the host vehicle target determination unit 23 to be the traffic light intended for the vehicle 1.

The housing area extraction unit 21, the light state determination unit 22, the host vehicle target determination unit 23, and the tracking unit 24 each repeatedly perform the above-described operations in each predetermined processing cycle. The processing cycle may be the processing cycle of the light state recognition device 20. The processing cycle may be a cycle corresponding to the transmission timing of the signal regarding the captured image of the front camera 11.

The tracking unit 24 further tracks the traffic lights that appear in the captured image. Specifically, the tracking unit 24 stores the position of the housing of the traffic light indicated by the housing position information in the past processing cycle (for example, the previous processing cycle) stored in the storage device 12, and the position of the housing in the current processing cycle. By comparing the position of the housing of the traffic light indicated by the housing position information, the identity of the traffic light is grasped. The tracking unit 24 compares the lighting state information in the past processing cycle (for example, the previous processing cycle) stored in the storage device 12 with the lighting state information in the current processing cycle to determine the lighting state of the traffic light. Track transitions.

The tracking unit 24 may transmit to the driving assistance device 14 the lighting state information related to the traffic lights intended for the vehicle 1. The driving assistance device 14 may perform driving assistance for assisting the driver of the vehicle 1 based on the lighting state information. If the lighting state indicated by the lighting state information is a passage prohibition state or a signal transition state, the driving assistance device 14 may alert the driver of the lighting state of the traffic light via the HMI 13. When the lighting state indicated by the lighting state information is a passage prohibited state or a signal transition state, the driving assistance device 14 may transmit a control signal to the brake actuator included in the actuator 15 to perform automatic deceleration control of the vehicle 1.

The cut-off determination area setting unit 25 sets a closed area determination area on the captured image when the light state determination unit 22 recognizes that the traffic light is a traffic light with an arrow light. The cut-off determination area is an area for determining cut-out of arrow lights and main lights in a traffic light with arrow lights. Here, "out of sight (out of sight)" means that at least a part of the traffic light does not appear in the captured image. The closed area determination area is set on the captured image so as to include the traffic lights with arrow lights. The out-of-view determination area is set on the captured image across a plurality of processing cycles.

The cut-out determination area will be described with reference to FIG. 4. FIG. 4 is an example of an image (corresponding to the image captured by the front camera 11) in which an intersection with a traffic light with arrow lights is included. It is assumed that the vehicle 1 is traveling from the lower side to the upper side in FIG. 4. The traffic lights S1 and S2 targeting the vehicle 1 (in other words, restricting the running of the vehicle 1) are installed at the intersection IS. A traffic light S1 is a traffic light on the front side when viewed from the vehicle 1. The traffic light S2 is a traffic light on the far side when viewed from the vehicle 1.

The cut-off determination area setting unit 25 may set the outage determination area C at a position including the traffic light S1 on the image shown in FIG. 4. The cut-off determination area setting unit 25 may set an area of a certain range centered on a traffic light with an arrow light on the captured image as the closed-out determination area. The cut-off determination area setting unit 25 positions each side of the rectangular frame-shaped breakage determination area at a fixed distance from the upper end, the lower end, the right end, and the left end of the housing area extracted by the housing area extraction unit 21. The out-of-view determination area may be set as follows.

Returning to FIG. 1, the arrow light cut-off determination unit 26 determines whether the arrow light exists in the breakage determination area for each processing cycle. The arrow light cut-off determination unit 26 may determine whether the arrow light exists within the breakage determination area by performing image processing on a region corresponding to the breakage determination area of the captured image.

The main light cut-off determination unit 27 determines whether the main light exists within the blackout determination area for each processing cycle. The main light cut-off determination unit 27 may determine whether the main light exists within the blackout determination area by performing image processing on a region corresponding to the blackout determination area of the captured image. Only when the arrow light cut-off determination unit 26 determines that the arrow light does not exist in the blackout determination area, the main light cut-off determination unit 27 determines whether the main light exists in the blackout determination area. You may The light state holding unit 28 temporarily holds the lighting state information in the past processing cycle (for example, the previous processing cycle) used by the tracking unit 24 to track the transition of the lighting state of the traffic light. As the lighting state information in the past processing cycle, the light state holding unit 28 may temporarily hold only the lighting state information related to the traffic light with an arrow light on the front side as viewed from the vehicle 1 (for example, the traffic light S1 in FIG. 4).

As shown in FIG. 4, when traffic lights S1 and S2 for the vehicle 1 are installed at one intersection IS, the light state determination unit 22 determines the lighting state of each of the traffic lights S1 and S2. The lighting state information indicating the lighting state of each of the traffic lights S1 and S2 is stored in the storage device 12.

Now, even when the vehicle 1 moves forward (i.e., approaches the intersection IS) from the situation shown in FIG. 4 and the traffic light S1 is cut off (i.e., at least part of the traffic light S1 is not captured in the captured image any more), the entire traffic light S2 can be expected to appear in the captured image.

In the current processing cycle, when the arrow light cut-off determination unit 26 determines that the arrow light does not exist in the blackout determination area, and the main light cut-off determination unit 27 determines that the main light does not exist in the blackout determination area. In at least one of the cases, the light state estimation unit 29 stores the lighting state of the traffic light S1 in the past processing cycle (for example, the previous processing cycle) temporarily held in the light state holding unit 28. State information (hereinafter referred to as "past lighting state of traffic light S1" as appropriate) and lighting state information indicating the lighting state of traffic light S2 determined by the light state determination unit 22 in the current processing cycle (hereinafter appropriately referred to as (referred to as "the current lighting state of the traffic light S2"), the current lighting state is estimated. Since the lighting states of the traffic lights S1 and S2 installed at the intersection IS are synchronized, the above "current lighting state" is the current lighting state of the traffic light S1 and the current lighting state of the traffic light S2. The "current lighting state" may be rephrased as the current travel regulation state of the vehicle 1.

The operation of the light state estimation unit 29 will be described with a specific example. When the past lighting state of the traffic light S1 and the current lighting state of the traffic light S2 match, the light state estimation unit 29 estimates a light state that is the past light state of the traffic light S1 and the current light state of the traffic light S2, as the current light state.

If the past lighting state of the traffic light S1 is different from the current lighting state of the traffic light S2, the light state estimation unit 29 may estimate the current lighting state of the traffic light S2 as the current lighting state. For example, if the past lighting state of the traffic light S1 is a state in which the main light R and the arrow light RA are lit, and the current lighting state of the traffic light S2 is a state in which only the main light R is lit, Based on the current lighting state of the traffic light S2, the light state estimation unit 29 may estimate a state in which only the main light R is lit as the current lighting state.

However, even if the past lighting state of the traffic light S1 and the current lighting state of the traffic light S2 are different, the current lighting state of the traffic light S2 indicates that the passage permission direction indicated by the arrow light is unknown (When the above-mentioned third state) is indicated, the light state estimation unit 29 estimates the passage permission direction indicated by the arrow light based on the past light state of the traffic light S1, and then estimates the current light of the traffic light S2. Based on the current lighting conditions, the current lighting conditions may be estimated.

For example, when the past light state of the traffic light S1 is a state in which the main light R and the arrow light LA are lit, and the current light state of the traffic light S2 is a state in which the main light R is lit and an area corresponding to the arrow light LA is lit (however, the passage permission direction is unknown), the light state estimation unit 29 may estimate that a state in which the main light R and the arrow light LA are lit as the current light state.

The light state estimation unit 29 transmits lighting state information indicating the estimated current lighting state to the tracking unit 24. In the current processing cycle, when the arrow light cut-off determination unit 26 determines that the arrow light does not exist in the blackout determination area, and the main light cut-off determination unit 27 determines that the main light does not exist in the blackout determination area. In at least one of these cases, the tracking unit 24 transmits lighting state information indicating the current lighting state estimated by the light state estimation unit 29 to the driving assistance device 14 in the current processing cycle.

Technical Effect

A lighting state with a traffic light is maintained for a certain period of time (for example, several seconds). Therefore, in the current processing cycle, when the arrow light cut-off determination unit 26 determines that the arrow light does not exist in the blackout determination area, and when the main light cut-off determination unit 27 determines that the main light does not exist in the blackout determination area. In at least one of these cases, the lighting state of the lost traffic light in the past processing cycle (e.g., the previous processing cycle) may be the same as the current lighting state of the traffic light. On the other hand, the lighting conditions associated with the lost traffic light in the past processing cycle may differ from the current lighting conditions of the traffic light. In the latter case, if the driving assistance device 14 performs driving assistance based on the lighting status of the traffic light that was cut off in the past processing cycle, unnecessary driving assistance (for example, at least one of alerting and automatic deceleration processing) may be performed or necessary driving assistance (for example, at least one of alerting and automatic deceleration processing) may not be performed.

In the light state recognition device 20 described above, for example, the lighting state in the past processing cycle (for example, the previous processing cycle) of the traffic light S1 that has been cut off (in other words, the traffic light S1 whose part is not captured in the captured image), The current lighting state is estimated based on the lighting state of the traffic light S2 in the current processing cycle. Although the lighting state of the traffic light S2 may be unclear on the captured image, the lighting state of the traffic light S2 indicates the lighting state of the most recent past from the current time. Here, the light transition pattern of the traffic light S1 and the light transition pattern of the traffic light S2 are the same. Therefore, even if the lighting state of the traffic light S2 is unclear on the captured image, the lighting state of the traffic light S2 can be estimated by referring to the lighting state in the past processing cycle of the traffic light S1 that was missed. Therefore, in accordance with the light state recognition device 20, from the light state of the cut off traffic light S1 in the past processing cycle and the light state of the traffic light S2 in the current processing cycle, the current light state (particularly, the light state of the arrow light) can be properly estimated. As a result, according to the light state recognition device 20, the driving assistance device 14 can suppress performing unnecessary driving assistance (for example, at least one of alerting and automatic deceleration processing) or not performing necessary driving assistance (for example, at least one of alerting and automatic deceleration processing).

Modification

When estimating the current lighting state, the light state estimation unit 29 indicates the lighting state of the traffic light S1 in the past processing cycle (for example, the previous processing cycle) temporarily held in the light state holding unit 28. Based on the lighting state information, the lighting state subsequent to the lighting state of the traffic light S1 indicated by the lighting state information may be predicted. If the predicted next lighting state is a yellow light (that is, a signal transition state), the light state estimation unit 29 may predict the next lighting state after the yellow light. If the lighting state of the traffic light S2 in the current processing cycle differs from the predicted lighting state, the light state estimation unit 29 may discard the lighting state information indicating the lighting state of the traffic light S2 in the current processing cycle. In this case, the light state estimation unit 29 may estimate the current lighting state based on the lighting state of the traffic light S1 in the past processing cycle.

When estimating the current lighting state, the light state estimation unit 29 determines whether the lighting state of the traffic light S1 in the past processing cycle (for example, the previous processing cycle) is different from the lighting state of the traffic light S2 in the current processing cycle. If so, it may be determined whether the transition is from a yellow light (i.e., a signal transition state). If it is determined that the transition is not from a yellow light, the light state estimation unit 29 may discard the lighting state information indicating the lighting state of the traffic light S2 in the current processing cycle. In this case, the light state estimation unit 29 may estimate the current lighting state based on the lighting state of the traffic light S1 in the past processing cycle.

When extracting the housing region from the captured image, the housing area extraction unit 21 may determine whether the traffic light has the housing of the arrow light. If it is determined that there is an arrow light housing, the housing area extraction unit 21 may estimate the direction of the arrow light in which the traffic light can be turned on (that is, the passage permitted direction). The directions of the arrow lights in which the traffic lights can be turned on estimated by the housing area extraction unit 21 may be output to the light state determination unit 22. With this configuration, the lighting state of the traffic light can be determined more appropriately.

Aspects of the disclosure derived from the embodiments and modifications described above will be described below.

A light state recognition device according to an aspect of the disclosure is installed at an intersection in front of an own vehicle for each predetermined processing cycle, and is a first traffic light with an arrow lamp on the near side as viewed from the own vehicle. and a second traffic light, which is installed at the intersection and is a traffic light with an arrow light on the back side as viewed from the own vehicle, based on an image in which the first traffic light and the second traffic light are respectively and if at least part of the first traffic light is not reflected in the image in the current processing cycle, the determination unit in a past processing cycle prior to the current processing cycle an estimation unit for estimating the current lighting state based on the lighting state of the first traffic light determined by the current processing cycle and the lighting state of the second traffic light determined by the determination unit in the current processing cycle; Be prepared.

In the above-described embodiment, the light state determination unit 22 corresponds to an example of determination unit, and the light state estimation unit 29 corresponds to an example of estimating means. The traffic light S1 in FIG. 4 corresponds to an example of a first traffic light, and the traffic light S2 corresponds to an example of a second traffic light. The first traffic light and the second traffic light may be traffic lights that regulate travel of the own vehicle.

When the lighting state of the first traffic light determined by the determination unit in the past processing cycle is different from the lighting state of the second traffic light determined by the determination unit in the current processing cycle, the estimation unit may estimate the current lighting state based on the lighting state of the second traffic light determined by the determination unit in the current processing cycle.

The lighting state of each of the first traffic light and the second traffic light may include a direction unknown state in which an arrow light is on and the direction of the lighted arrow light is unknown. When the light state of the second traffic light that is determined by the determination unit in the current processing cycle is the direction unknown state, the estimation unit may estimate a direction that the arrow light points, based on a lit position of the arrow light in the second traffic light.

The present disclosure is not limited to the above-described embodiments, and can be modified as appropriate within the scope not contrary to the gist or idea of the disclosure that can be read from the scope of claims and the entire specification. A light state recognition device with the modification is also included in the scope of the present disclosure.

What is claimed is:

1. A lighting-state recognition device comprising:
circuitry configured to
    capture an image that includes a first traffic light and a second traffic light, wherein
        the first traffic light is a traffic light with a first arrow light, the first traffic light being installed at an intersection in front of a host vehicle and being on a closer side when viewed from the host vehicle, and
        the second traffic light is a traffic light with a second arrow light, the second traffic light being installed at the intersection and being on a further side when viewed from the host vehicle; and
    analyze the captured image to determine a first lighting-state indicating a lighting state of the first traffic light, and a second lighting-state indicating a lighting state of the second traffic light at predetermined processing cycles, wherein
    the circuitry is configured to estimate the first lighting-state of a current processing cycle based on the first lighting-state determined in a preceding processing cycle when
        at least part of the first traffic light is not captured in the image in the current processing cycle; and the first lighting-state determined in a preceding processing cycle agrees with the second lighting state determined in the current processing cycle, and the circuitry is configured to transmit the estimated first lighting-state of the current processing cycle to a driving assistance device to control a vehicle in accordance with the estimated first lighting-state, each of the first lighting-state and the second lighting-state further includes a first direction-unknown state and a second direction-unknown state, respectively the first direction-unknown state indicating that a direction indicated by the first arrow light is unknown when the first arrow light is lit; and the second direction-unknown state indicating that the direction indicated by the second arrow light is unknown when the second arrow light is lit, and the circuitry is configured to estimate the direction in which the second arrow light is pointing based on a position of the second arrow light that is lit in the second traffic light when the second lighting state is the second direction-unknown state.

2. The light state recognition device according to claim 1, wherein when the first lighting-state in the preceding processing cycle is different from the second lighting-state in the current processing cycle, the circuitry estimates the first lighting-state of the current processing cycle based on the second lighting-state of the current processing cycle.

3. The light state recognition device according to claim 1, wherein the first traffic light and the second traffic light are traffic lights that restrict traveling of the host vehicle.

* * * * *